United States Patent
Burk et al.

[15] 3,689,660
[45] Sept. 5, 1972

[54] STABLE LIQUID ANTIMICROBIAL COMPOSITION

[72] Inventors: George A. Burk, Bay City, Mich. 48706; Jurgen H. Exner, Midland, Mich. 48640

[73] Assignee: The Dow Chemical Company, Midland, Mich.

[22] Filed: July 31, 1970

[21] Appl. No.: 60,094

[52] U.S. Cl..................................424/304, 424/358
[51] Int. Cl..........................A01n 9/20, A01n 17/08
[58] Field of Search........................424/304, 83, 358

[56] References Cited

UNITED STATES PATENTS

| | | |
|---|---|---|
| 3,493,658 | 2/1970 | Schmidt et al..........424/304 X |
| 2,419,888 | 4/1947 | Nolan et al................424/320 |
| 2,731,386 | 1/1956 | Reiner......................424/231 |

OTHER PUBLICATIONS

"Carbowax" Technical Bulletin of Union Carbide Chem. Co. (F4772E), 1960 pp. 3–6 & 16.

Primary Examiner—Albert T. Meyers
Assistant Examiner—Leonard Schenkman
Attorney—Griswold & Burdick, Maynard R. Johnson and C. Kenneth Bjork

[57] ABSTRACT

Stable liquid compositions useful as antimicrobial agents comprise a halocyanoacetamide such as 2,2-dibromo-2-cyanoacetamide and a straight-chain polyalkylene glycol such as polyethylene glycol 200. The compositions can also contain water.

7 Claims, No Drawings

STABLE LIQUID ANTIMICROBIAL COMPOSITION

BACKGROUND OF THE INVENTION

The halocyanoacetamides employed in the composition of the invention are useful as antimicrobials in various applications as disclosed by Nolan et al. U.S. Pat. No. 2,419,888, Schmidt et al., U.S. Pat. No. 3,493,658, and CIBA S.A. Belgian Patent No. 668,336. Certain of the compounds are useful in the finishing of textiles, as taught by Chance et al. U.S. Pat. No. 3,403,174, and others are useful as slimicides in aqueous systems such as paper pulp as disclosed in the application of Paul A. Wolf, Ser. No. 650,264, filed June 30, 1967 now abandoned.

In the preparation, storage, shipment and use of antimicrobial agents generally it is often desirable to employ the agents in the form of liquid concentrate compositions. Such compositions should be stable over extended periods under a variety of conditions of temperature, humidity, freeze-thaw cycles and the like, should be compatible with conventional container materials and readily diluted in the formulation of treating compositions. It would be desirable to provide a stable liquid concentrate composition containing a halocyanoacetamide.

BRIEF SUMMARY OF THE INVENTION

This invention is concerned with compositions comprising a halocyanoacetamide compound and a polyalkylene glycol or ether thereof and is particularly directed to compositions comprising a solution of a halocyanoacetamide corresponding to the formula

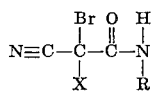

wherein X represents hydrogen, chlorine or bromine, and R independently represents hydrogen or methyl, in an organic liquid selected from the group consisting of straight chain polyalkylene glycols of the ethylene or trimethylene series and mono- or di- lower alkyl ethers thereof, the organic liquid having an average molecular weight of from about 134 to about 600. The term "lower alkyl" as employed herein, refers to methyl, ethyl, normal propyl and normal butyl. The liquid concentrate compositions of the invention preferably contain one or more halocyanoacetamide compounds in an amount of from about one percent by weight to about saturation of the solution, and generally contain from about one to about 5 to about 10, to about 15, to about 20, to about 25, to about 30, to about 55, to about 60 percent by weight of the halocyanoacetamide. The compositions of the invention are clear, nearly colorless or pale green liquids which are stable for extended periods under a wide variety of storage, packaging and handling conditions. They are easily handled, and can be employed directly as antimicrobial agents or diluted with conventional inert diluents or substrates, such as water, alcohols, and the like to prepare ultimate treating compositions for application to bacteria and fungi.

The halocyanoacetamide compounds, while they are active in the presence of water, have been found to possess insufficient storage stability in aqueous concentrate solutions to permit convenient storage and shipping of aqueous concentrates. For example, solutions of 2,2-dibromo-2-cyanoacetamide in water show substantial losses in active ingredient concentration and antimicrobial potency after one or 2 week's storage.

Many common organic solvents are unsuitable for use with the bromocyanoacetamide compounds. For example, when 2,2-dibromo-2-cyanoacetamide is dissolved in organic liquids such as cyclohexanone, formaldehyde, acetone, ethers such as diethyl ether, alcohols such as ethylene glycol, cyclic ethers such as dioxane and tetrahydrofuran, polypropylene glycols or dimethyl sulfoxide the bromocyanoacetamide concentration decreases rapidly in relatively short periods of time. Such decomposition is often accompanied by the appearance of colored decomposition products and tarry residues and solids are formed in many such solutions in from a few hours to a few months.

The compositions of the present invention retain high active ingredient concentrations and high antimicrobial activity for several years. The compositions also have excellent freeze-thaw stability, excellent dispersibility in water, compatibility with container materials such as glass, steel and the like, and compatibility with various aqueous systems to be protected from microbial attack. A particularly useful feature of the invention is that the compositions retain their halocyanoacetamide concentration and antimicrobial activity even in the presence of substantial amounts of water, for example, from zero to about 5 to about 10, to about 16 to about 20 percent by weight of water can be employed in the compositions of the invention. Thus the composition can contain from 20 to 99 percent of the organic liquid, from 1 to about 60 percent of the halocyanoacetamide and from zero to 20 percent of water, the liquid ingredients being, preferably employed in a ratio of from about zero to about one-third part by weight of water per one part by weight of organic liquid.

In preparing the compositions of the invention one or more halocyanoacetamide compound is dissolved in a polyalkylene glycol or ether in any convenient procedure. The halocyanoacetamide compounds dissolve readily in the polyalkylene glycols and ethers at ambient temperatures. When desired, the concentrated solution can be diluted by the addition of water, or additional polyalkylene glycol or the like to provide a liquid concentrate composition having a particular desired viscosity.

The polyalkylene glycols and ethers which can be employed in the composition of the invention are polyethylene glycols and trimethylene glycols and mono- and di- lower alkyl ethers thereof having an average molecular weight of from about 134 to about 600. The average molecular weight of a particular polyalkylene glycol is herein indicated according to established usage by a numeral following the name, i.e., polyethylene glycol 400 to a polyethylene glycol having an average molecular weight of about 400. A preferred group of polyalkylene glycols and mono- and di-lower alkyl ethers thereof comprises such glycols and ethers having the above average molecular weight and which include at least three molecular proportions of ether linkages [—CH$_2$—O—CH$_2$—] per mole, such as in diethylene glycol diethyl ether, di-trimethylene glycol di-nypropyl ether, triethylene glycol n-butyl ether or the like. The polyalkylene glycols are typically liquids at typical temperatures of use (about 25°–35° C.) and are readily soluble in water. Suitable polyalkylene glycols and ethers include triethylene glycol, polyethylene glycol 200, tetraethylene glycol, polyethylene glycol 400, diethylene glycol dimethyl ether, polytrimethylene glycol 200, diethylene glycol, triethylene glycol, methyl ether and polyethylene glycol 600. Preferably, the polyalkylene glycol or ether ingredient is a polyethylene glycol or mixture of polyethylene glycols having an average molecular weight of from about 175 to 250, and polyethylene glycol 200 is the polyalkylene glycol of choice.

The halocyanoacetamide can be 2-bromo-2-cyanoacetamide, 2,2-dibromo-2-cyanoacetamide, 2-bromo-2-chloro-2-cyanoacetamide, or an N-methyl thereof or a mixture of one or more such compounds. The compound 2,2-dibromo-2-cyanoacetamide is particularly useful in the present compositions. The high antimicrobial activity of 2,2-dibromo-2-cyanoacetamide in aqueous cellulosic systems (see the application of Paul A. Wolf, Ser. No. 650,264, filed June 30, 1967 now abandoned) is enhanced by the use of the composition of the invention providing more rapid antimicrobial effects. In addition, the compositions of the invention can be employed in the preservation of oil-in-water emulsions such as drilling oil emulsions without adversely affecting the physical and chemical properties of the emulsion. They can be mixed with a wide variety of aqueous dispersions subject to microbial attack in amounts sufficient to provide an antimicrobial amount of the halocyanoacetamide in the dispersion. Ultimate concentrations of halocyanoacetamide of from about 0.5 to 10 to 500 parts per million are generally suitable for antimicrobial use in most applications. In addition, the compositions containing bromocyanoacetamides can be employed in preserving water such as cooling water, industrial wash water, paper pulp slurries and the like having a neutral or acid pH, and the resulting water can be then rendered relatively innocuous to organisms prior to discharge to a waste water treatment facility or a lake, river or stream. In such procedure a composition of the invention can be mixed with the water to be treated to provide an ultimate concentration of from about 0.5 to about 100 parts of the bromocyanoacetamide compound per million parts of ultimate mixture and the mixture is mixed with a base such as sodium hydroxide to provide a pH of about pH 8 to pH 11.5 for from a few minutes to about 24 hours prior to discharge or exposure to desirable microorganisms. (Further details of this procedure are described in the copending application of Paul A. Wolf, application Ser. No. 60,095, filed concurrently herewith, as a continuation-in-part of application Ser. No. 650,264, filed June 30, 1967 now abandoned). Although the compositions are extremely stable in storage, after such dilution, use and treatment the active antimicrobial ingredient can be easily, rapidly and inexpensively rendered relatively harmless to the environment. When employed in alkaline aqueous media, particularly at a pH of 8 or above, the compositions are advantageously employed in systems in which a quick initial kill of bacteria or fungi is desired without enduring antimicrobial activity.

DESCRIPTION OF PREFERRED EMBODIMENTS

EXAMPLE 1

A series of compositions is prepared by dissolving dried, substantially anhydrous 2,2-dibromo-2-cyanoacetamide in polyethylene glycol 200 to provide a series of compositions containing about 5, 10 or 20 percent by weight of the bromocyanoacetamide compound. A similar series of compositions is prepared using 2,2-dibromo-2-cyanoacetamide which has been washed with water and filtered, but not dried. The compositions are stored in closed glass containers at a temperature of 50° C. and are periodically assayed to determine the concentration of the bromocyanoacetamide remaining. After 40 days at 50° C. all the compositions are found to contain levels of active ingredient about 0.8, 0.5 and 0.4 percent less (based on total weight of composition) than the amounts initially present in the compositions containing about 20, 10, and 5 percent, respectively, of the compound.

In a similar operation, solutions containing 50 percent by weight of 2,2-dibromo-2-cyanoacetamide in polyethylene glycol 200 or 60 percent by weight of such compound in diethylene glycol dimethyl ether are found to retain at least 95 percent of their original 2,2-dibromo-2-cyanoacetamide concentration after 9 months' storage at room temperature.

EXAMPLE 2

In a similar accelerated aging operation carried out at 65° C. solutions of 20 parts of 2,2-dibromo-2-cyanoacetamide by weight in one of (a) 80 parts by weight of polyethylene glycol 200 (b) 64 parts by weight of polyethylene glycol 200 and 16 parts by weight of water (c) 50 parts by weight of polyethylene glycol 200 and 30 parts of water, (d) 40 parts by weight each of polyethylene glycol 200 and water and (e) 80 parts by weight of polypropylene glycol 400 are held for 20 days. Composition (e) containing 20 percent of the bromocyanoacetamide in polypropylene glycol 400 is observed to develop a yellow color rapidly, turning to a brown discoloration with formation of a precipitate after 8 days. Compositions (a) and (b) retain a clear, nearly colorless appearance with a pale greenish cast and are found after eight days to retain 90 percent or more of their 2,2-dibromo-2 -cyanoacetamide concentration, while composition (e) is found to have lost more than 75 percent of its active ingredient. At the end of the 20 day period the compositions (a) and (b) are found to retain more than 80 percent of their initial bromocyanoacetamide concentration while compositions (c) (d) and (e) are found to have lost more than 80 percent of their initial bromocyanoacetamide concentration.

EXAMPLE 3

Two compositions containing 20 percent by weight of 2,2-dibromo-2-cyanoacetamide in (A) polyethylene glycol 200 or (B) a mixture of 20 percent by weight of water in polyethylene glycol 200 are subjected to a series of freeze-thaw cycles. In such operations the compositions are held at a temperature of minus 15° C. for 24 hours, then warmed to room temperature. After seven such sequences both compositions appear similar to their initial appearance, and no precipitated solid is observed in either composition at any time.

EXAMPLE 4

A series of stable antimicrobial compositions is prepared according to the following recipes:

| | Ingredient | Parts by Weight |
|---|---|---|
| (A) | 2-Bromo-2-cyanoacetamide | 5 |
| | 2-Bromo-2-chloro-2-cyanoacetamide | 5 |
| | Poly(trimethylene glycol) having an average molecular weight of about 300 | 90 |
| (B) | 2-Bromo-2-cyanoacetamide | 15 |
| | Polyethylene glycol 600 | 35 |
| | Triethylene glycol n-butyl ether | 50 |
| (C) | 2,2-Dibromo-2-cyanoacetamide | 12 |
| | 2,2-Dibromo-2-cyano-N-methyl acetamide | 3 |
| | Polyethylene glycol 200 | 50 |
| | Diethylene glycol diethyl ether | 5 |
| | Polyethylene glycol 400 | 10 |
| | Water | 5 |
| (D) | 2,2-Dibromo-2-cyanoacetamide | 60 |
| | Diethylene glycol dimethyl ether | 40 |
| (E) | 2-Bromo-2-chloro-2-cyano-N-methylacetamide | 25 |
| | Polyethylene glycol 200 | 60 |
| | Polyethylene glycol 400 | 5 |
| | Water | 10 |
| (F) | 2,2-Dibromo-2-cyanoacetamide | 42 |
| | Polyethylene glycol 200 | 46 |
| | Water | 12 |
| (G) | 2,2-Dibromo-2-cyanoacetamide | 54.5 |
| | Polyethylene glycol 200 | 45.5 |

EXAMPLE 5

A solution of 20 percent 2,2-dibromo-2-cyanoacetamide in polyethylene glycol 200 is added to paper pulp stock in a tank and in a broke chest. The composition is added in an amount sufficient to provide 40 parts by weight of 2,2-dibromo-2-cyanoacetamide per million parts by weight of the ultimate aqueous dispersion. At the time of addition, the stock in tank and broke chest have organism counts of about 15 million and greater than 20 million organisms per milliliter, respectively. After one week under ambient conditions, organism counts of about 100,000 organisms per milliliter are observed in the tank and broke chest stock, and counts of 10,000 and 30,000 organisms per milliliter are observed in the bank and broke chest stock after 11 days. At such time the stock has a good consistency and color and neutral odor. A sample of similar stock held for the same period under identical conditions is found to be darkened and to have a rotten pulpy odor after 11 days.

What is claimed is:

1. A stable antibacterial and antifungal composition comprising a solution of an effective amount of 2,2-dibromo-2-cyanoacetamide in an organic liquid selected from the group consisting of a polyethylene glycol having a molecular weight of from about 175 to 250, a polyethylene glycol having a molecular weight of about 400 and triethylene glycol.

2. The composition of claim 1 wherein the organic liquid is a polyethylene glycol having a molecular weight of about 200.

3. A stable antibacterial and antifungal composition comprising a mixture of from about 0 to about 20 percent by weight of water, from about 1 to 60 percent by weight of 2,2-dibromo-2-cyanoacetamide and from about 20 to about 99 percent by weight of an organic liquid selected from the group consisting of a polyethylene glycol having a molecular weight of about 175 to 250, a polyethylene glycol having a molecular weight of about 400 and triethylene glycol.

4. The composition of claim 3 wherein the organic liquid is a polyethylene glycol having a molecular weight of about 200.

5. The composition of claim 3 wherein the composition contains from about 15 to about 25 percent by weight of 2,2-dibromo-2-cyanoacetamide and from zero to about 16 percent by weight of water, and wherein the organic liquid is a polyethylene glycol having a molecular weight of about 200.

6. A stable antibacterial and antifungal composition consisting essentially of a solution of 2,2-dibromo-2-cyanoacetamide in a polyethylene glycol having a molecular weight of about 200, the concentration of 2,2-dibromo-2-cyanoacetamide being from about 5 to about 20 percent by weight.

7. The composition of claim 6 wherein the 2,2-dibromo-2-cyanoacetamide is present in a concentration of about 20 percent by weight.

* * * * *